(12) United States Patent  (10) Patent No.: US 8,306,847 B2
Sperry  (45) Date of Patent: Nov. 6, 2012

(54) SYSTEM AND METHOD OF FORECASTING PRINT DEMAND

(75) Inventor: Robert H Sperry, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1230 days.

(21) Appl. No.: 12/109,411

(22) Filed: Apr. 25, 2008

(65) Prior Publication Data

US 2009/0268231 A1   Oct. 29, 2009

(51) Int. Cl.
*G06F 17/00* (2006.01)
(52) U.S. Cl. .................................................... 705/7.31
(58) Field of Classification Search .................. 705/7.31
See application file for complete search history.

(56) References Cited

U.S. PATENT DOCUMENTS

| 2009/0094094 A1* | 4/2009 | Rai et al. ......................... 705/10 |
| 2009/0157579 A1* | 6/2009 | Rai ................................ 706/21 |

* cited by examiner

*Primary Examiner* — Thomas Dixon
(74) *Attorney, Agent, or Firm* — Fox Rothschild LLP

(57) ABSTRACT

A system and method are provided for performing forecasting with respect to total demand data (including two or more demand components) collected in a print production environment. Each demand component (comprising a set of demand component related points corresponding with a first time scale) may be processed in such a way that a demand component related point can be forecasted with demand component related points corresponded with the second time scale. Both the forecasted demand component related point and demand component related points corresponded with the second time scale can then be corresponded with the first time scale.

18 Claims, 16 Drawing Sheets

SYSTEM AND METHOD OF FORECASTING PRINT DEMAND

CROSS-REFERENCE TO RELATED APPLICATION

Cross-reference is made to U.S. patent application. Ser. No. 11/868,993 to Rai et al. entitled System and Method of forecasting Print Job Related Demand (filed on Oct. 9, 2007) which is incorporated herein by reference in its entirety.

BACKGROUND AND SUMMARY

The disclosed embodiments relate generally to an approach for improving the operability of a print production environment and, more particularly to a method and system applicable to an environment where print jobs that recur in a cyclic pattern are processed.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

In one example of print shop operation, product variety (e.g., the requirements of a given job) can be low, and the associated steps for a significant number of jobs might consist of printing, inserting, sorting and shipping. In another example, product variety (corresponding, for instance, with job size) can be quite high and the equipment used to process these jobs (e.g. continuous feed machines and inserting equipment) can require a high changeover time. Experience working with some very large print shops has revealed that print demand exhibits a tremendous variety of time series behavior. High variability in such large print shop environments can result from large volumes, and may be manifested in what is sometimes referred to as "fat-tailed" or "heavy-tailed" distributions.

Forecasting demand for a given large print shop can be useful in, among other things, managing shop resources. In one approach, as described by the above-referenced U.S. patent application Ser. No. 11/868,993, a time series (representing total demand) is disaggregated into at least two demand components with one of the demand components having a first variability level and another demand component having a second variability. One forecasting technique may then be applied to the one demand component with the first variability level and another forecasting technique to the other demand component with the second variability level. In turn, the forecasted demand components may be re-aggregated to obtain a forecast for total demand.

While this approach is well suited for its intended purpose, it appears to contemplate uniform sampling, throughout disaggregation, forecasting and aggregation, with the same sampling interval. Using the same sampling interval throughout, however, can make forecasting of a given demand component needlessly difficult. That is, it might be difficult to perform forecasting for a demand component series using the same sampling interval as the total demand time series from which the demand component series was extracted.

In one aspect of the disclosed embodiments there is disclosed a print demand forecasting system for use with a print production system in which multiple print jobs are processed over a selected time interval. The print demand forecasting system includes: a data collection tool, said data collection tool collecting print demand data for each print job processed during the selected time interval, wherein the print demand data comprises a set of aggregated demand related points corresponding with a first time scale; a memory; and a computer implemented service manager for processing the stored set of aggregated demand related points to obtain a first demand component and a second demand component, the first demand component including a first set of demand component related points and the second demand component including a second set of demand component related points, wherein each one of a total number of demand component related points in the first set of demand component related points and a total number of demand component related points in the second set of demand component related points is less than a total number of aggregated demand related points, said memory comprising one or more programming instructions that, when executed, instruct said computer implemented service manager to: process the first set of demand component related points in such a way that at least some of the demand component related points of the first set of demand component related points are corresponded with a second time scale, forecast a demand component related point with the first set of demand component related points corresponded with the second time scale, and correspond both the forecasted demand component related point and the first set of demand related points corresponded with the second time scale with the first time scale to obtain a third set of demand component related points.

In another aspect of the disclosed embodiments there is disclosed a print demand forecasting method for use with a print production system in which multiple print jobs are processed over a selected time interval. The print demand forecasting method includes: A. using a processor to process a stored set of aggregated demand related points, corresponding with a first time scale, to obtain a first demand component and a second demand component, the first demand component including a first set of demand component related points and the second demand component including a second set of demand component related points, wherein each one of a total number of demand component related points in the first set of demand component related points and a total number of demand component related points in the second set of demand component related points is less than a total number of aggregated demand related points; and B. using the processor to (1) process the first set of demand component related points in such a way that the that at least some of the demand component related points of the first set of demand component related points are corresponded with a second time scale, (2) forecast a demand component related point with the first set of demand component related points corresponded with the second time scale, and (3) correspond both the forecasted demand component related point and the first set of demand related points corresponded with the second time scale with the first time scale to obtain a third set of demand component related points.

DESCRIPTION OF DISCLOSED EMBODIMENTS

Figure 1:
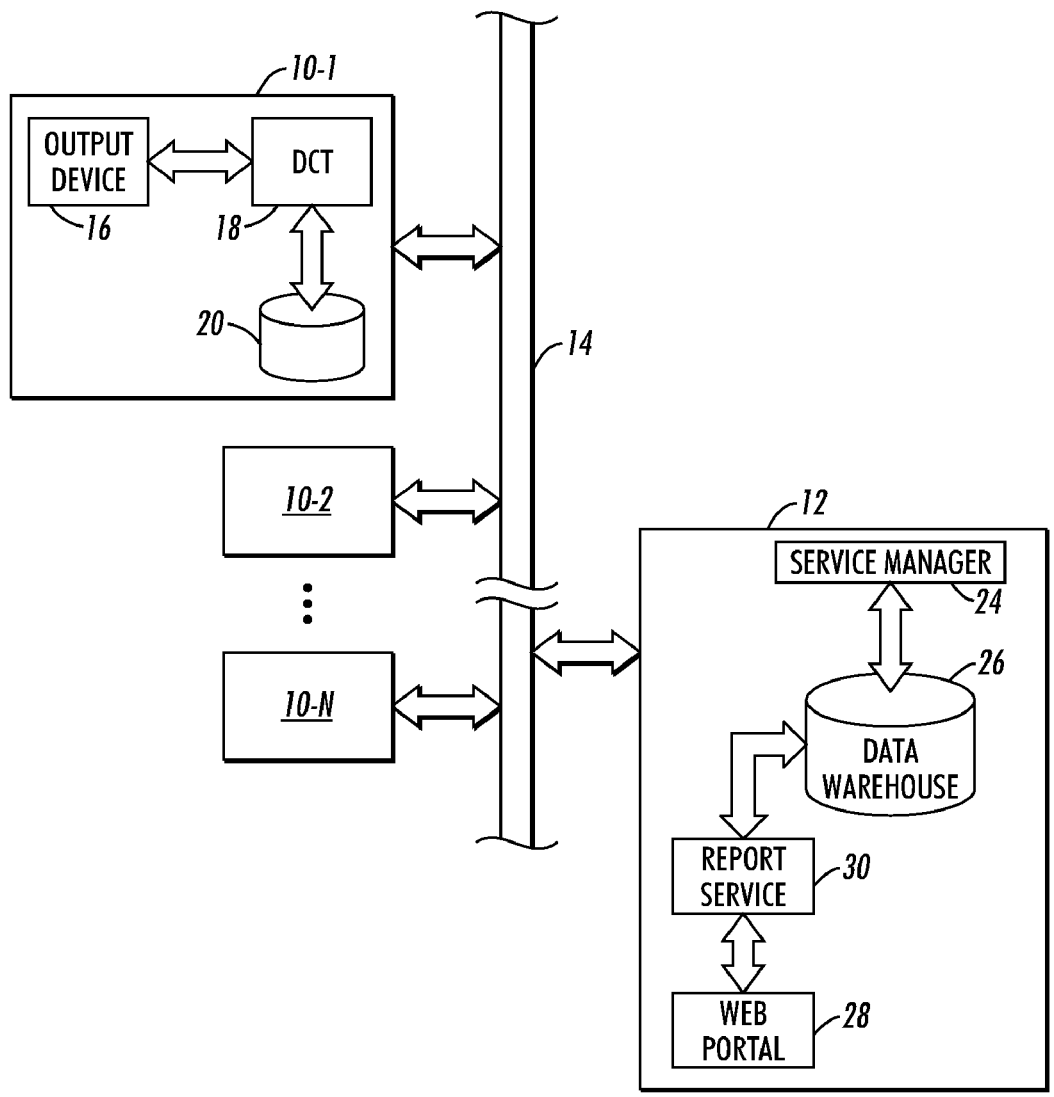
FIG. 1 is a block diagram of a data collection/processing architecture, suitable for use with the disclosed embodiments.

Referring to FIG. 1, a network print production system, with a data processing center, is shown. In the illustrated approach of FIG. 1, a series of document production centers 10-1 through 10-N (collectively referred to as document production centers 10, some of which may include print shops or production print facilities) communicate with the data processing center 12 by way of a network (such as a wide area network (possibly including the world wide web)) 14. At least one of the document production centers (e.g., document production center 10-1) includes an output device 16 communicating with a data collection tool ("DCT") 18. While particular attention is paid below to document production center 10-1, several of the document production centers 10 may include the combination of at least one output device and a DCT. Additionally, as should be apparent to those skilled in the art, the output device 16 may be used in the context of a print shop with a number of other document processing related devices, as illustrated in U.S. Pat. No. 7,079,266 to Rai et al., which is incorporated herein by reference in its entirety.

In one example, the DCT is a programmable subsystem (possibly assuming the form of a suitable application programmable interface) capable of capturing data, including performance or demand related data, from the output device at selected time intervals. it should be appreciated that, consistent with U.S. Pat. No. 7,242,302 to Rai et al., which is incorporated herein by reference in its entirety, the output device could assume a number of forms, such as a handheld device, PDA, or REID related device. The DCT 18 may communicate with mass memory 20 for short term storage of, among other things, demand related data. Additionally, a wide variety of performance related information from the output device 16, including information relating to job type, client, duplex/simplex, page counts and impression counts, just to name a few, may be stored in mass memory 20.

The data processing center 12 includes a "service manager" 24 communicating with a "data warehouse" 26. In one illustrated embodiment, the service manager comprises a processing platform that is capable of performing the types of forecasting calculations described below. As contemplated, a variety of data from the document production centers 10, including demand data from mass memory 20, is stored in the data warehouse. The data warehouse may also store job performance related data in the form of a database to facilitate a data segmentation approach, as described below. In the illustrated approach of FIG. 1, output of the service manager is placed in a format (e.g., a report including at least one forecast plot) suitable for communication to a network web portal 28 by a report generating application or service 30. The report, in turn, can be used, to the extent necessary, to adjust operation of the document production center to which the report relates. One such adjustment might include ordering inventory based on the report, while another such adjustment might include using the report to control aggregate or capacity planning.

Referring still to FIG. 1, and particularly to the service manager 24, the associated application may use historical print demand to forecast future demand. Based on investigations performed by the present inventors, print demand data (for example, daily page counts or impression counts) for production print shops show unique properties that are not necessarily found in the other domains where forecasting is applied (such as econometrics or product demand). These investigations have shown a substantial amount of variety in time series behavior, including time series with trends, cycles, and some fat-tailed phenomena. Indeed, the time series encountered by the present inventors in the context of production printing do not appear amenable to the sorts of decomposition suggested by the forecasting literature. Inspired by the unique properties of print demand, the present inventors have developed a decomposition strategy that is contrary to the decomposition strategies of the literature. As will appear, the reason the disclosed strategy works is that the statistical models for time series are extended to mixtures, which may not work for many of the data to which time series analysis is applied, but has been found to work very well for print demand data, especially that in production print shops.

Many of the observed time series in the area of production printing appear to demonstrate mixture-like behavior. These mixtures, however, are not necessarily well modeled by a single model, particularly when one component has high volumes and/or high variability. Further, the high variability component may be the result of simply a high but finite variance or could be "fat-tailed" (infinite variance). In the former case, it has been found that forecasting is possible if the high variability component has a strong periodic structure. In the latter case, however, forecasting has been found to be highly problematic and convergence is not achieved even when using the known auto regressive integrated moving average (ARIMA) algorithm with the corresponding model order increased.

In the disclosed embodiment, four kinds of decomposition methods are contemplated: 1) A user (print shop performance analyst) plots aggregate time series, notices a mixture behavior, determines which demand corresponds to which job type (indicated by a database field), and segments the time series based on those fields; 2) The user plots the aggregate time series, notices a mixture behavior, and selects the components graphically with a suitable user interface; 3) Mixtures are detected automatically using a model-fitting algorithm (e.g., Expectation—Maximization); and 4) Mixtures are identified by ancillary information such as Statements of Work or contractual obligations. Segmentation can be performed with a database attribute (e.g., an attribute, such as job or form type, client, duplex/simplex (i.e., media "plex"), obtained from the data warehouse 26 of FIG. 1), by time slice (e.g., Mondays or firsts of the month), or by statistical thresholding (e.g., demand over and under 30,000 prints).

Figure 2:
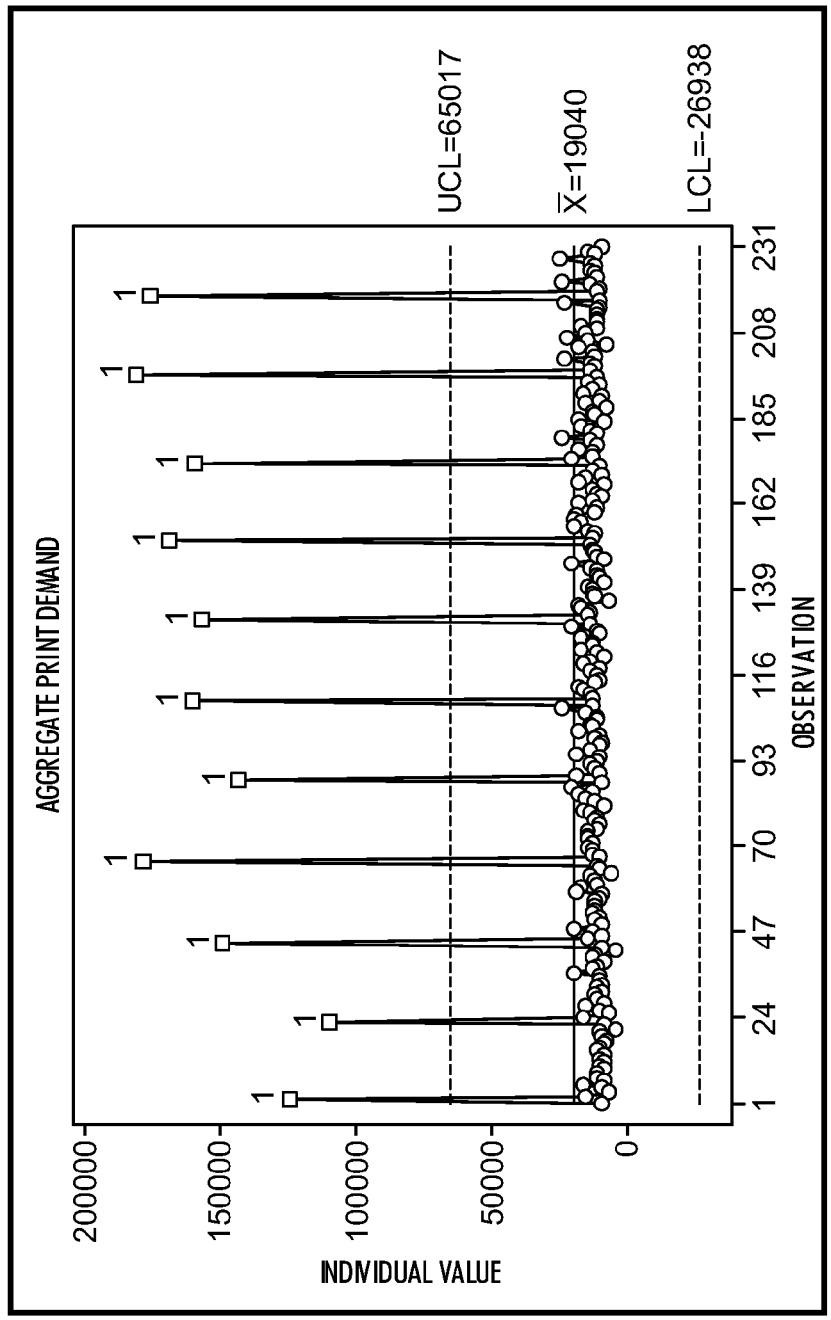
FIG. 2 is a control diagram illustrating the demand experienced by an exemplary production print shop.
Figure 3:
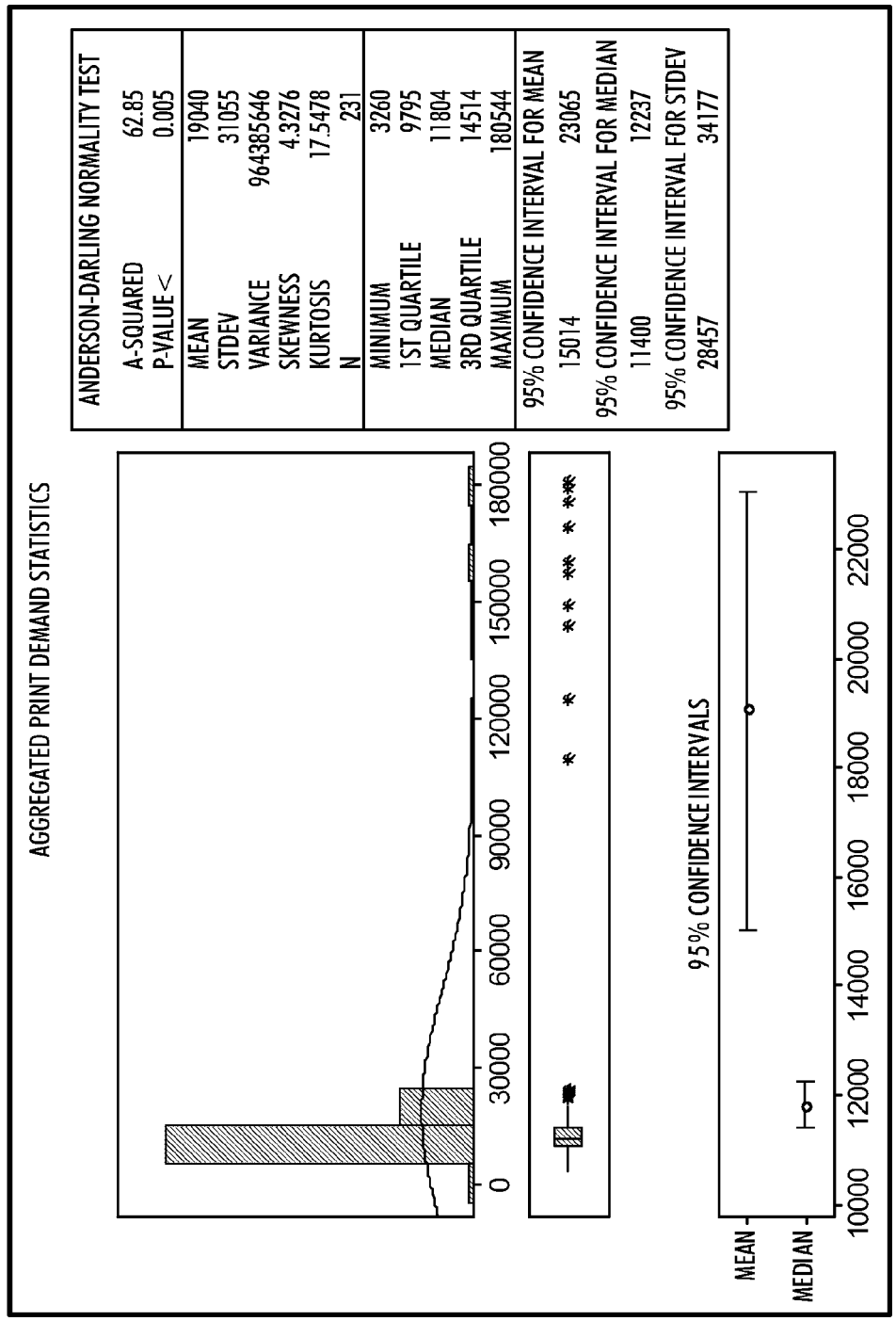
FIG. 3 is a schematic representation of the statistics associated with the demand experienced by the exemplary production print shop.

Referring to FIG. 2, the demand experienced by an exemplary production print shop is shown in the form of a control chart. The demand shown in FIG. 2 is an aggregation of demand for three different applications that run on three different form types. The high variability is reflected by the several points that are out of control. Referring to FIG. 3, statistics associated with the demand experienced by the exemplary production print shop is shown.

Figure 4:
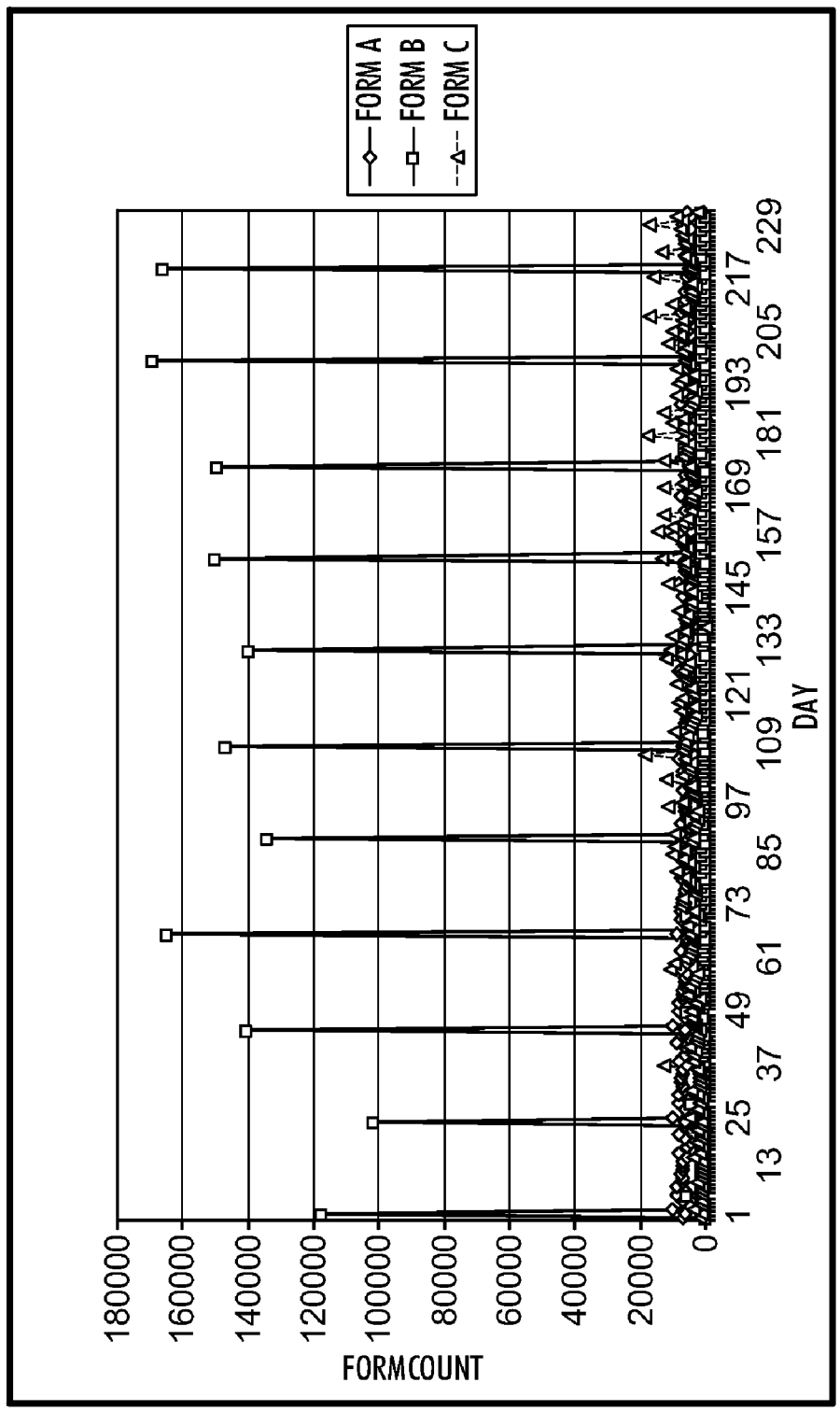
FIG. 4 is a graph illustrating independent demand for three individual applications.

Referring to FIG. 4, the independent demand for the three applications is shown. It can be observed, based on an inspection of FIG. 4, that the demand for Form B experiences significant fluctuations relative to the demand for either Form A or Form C. This observation can be confirmed by reference to the following table including selected information about Forms A-C.

TABLE 1

Statistical Characterization of Demand Profiles

|  | Form A | Form B | Form C |
| --- | --- | --- | --- |
| Count | 231 | 231 | 231 |
| Average | 5789 | 7578 | 5673 |
| Standard Deviation (SD) | 1596 | 30770 | 3388 |
| Coefficient of Variation (CV) | 0.28 | 4.06 | 0.60 |
| Total Volume | 1,337,189 | 1,750,512 | 1,310,443 |

In particular, the SD and CV associated with Form B are quite high relative to the SD and CV associated with either Form A or Form C.

Figure 5:
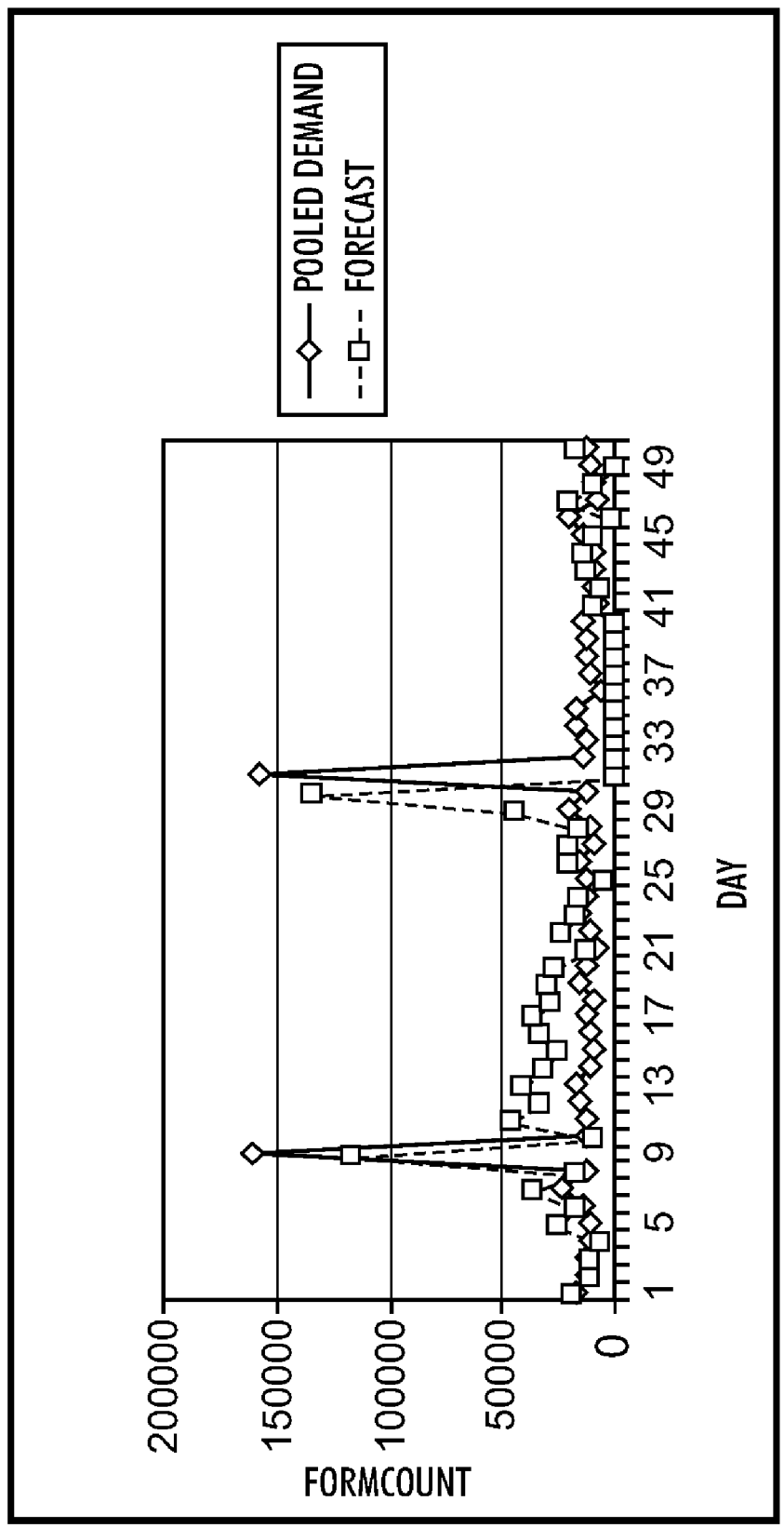
FIG. 5 is a graph illustrating a forecast for 50 days in which actual demand data is plotted against a forecast based on pooled demand from a single model.

Based on an accepted approach of the literature (in which demand from a single model is pooled), a forecast for the aggregated demand of Forms A-C was obtained with the ARIMA algorithm. Referring specifically to FIG. 5, actual demand versus forecasted demand is shown. The illustrated example of FIG. 5 includes a forecast for 50 days where mean absolute deviation (MAD) is 16,432 and mean absolute percentage error (MAPE) is 1.01.

It may be noted that a higher order ARIMA modeling was required to even get the single model to converge. More particularly, pursuant to the forecasting technique, the first 100 points were used to initially generate the single model. 10 days were then forecasted into the future. The next set of forecasts (10 days into the future) came from an ARIMA model built using 110 data points. Subsequently, an ARIMA model using 120 data points was built. Thus FIG. 5 includes five sets of forecasts.

Figure 6:
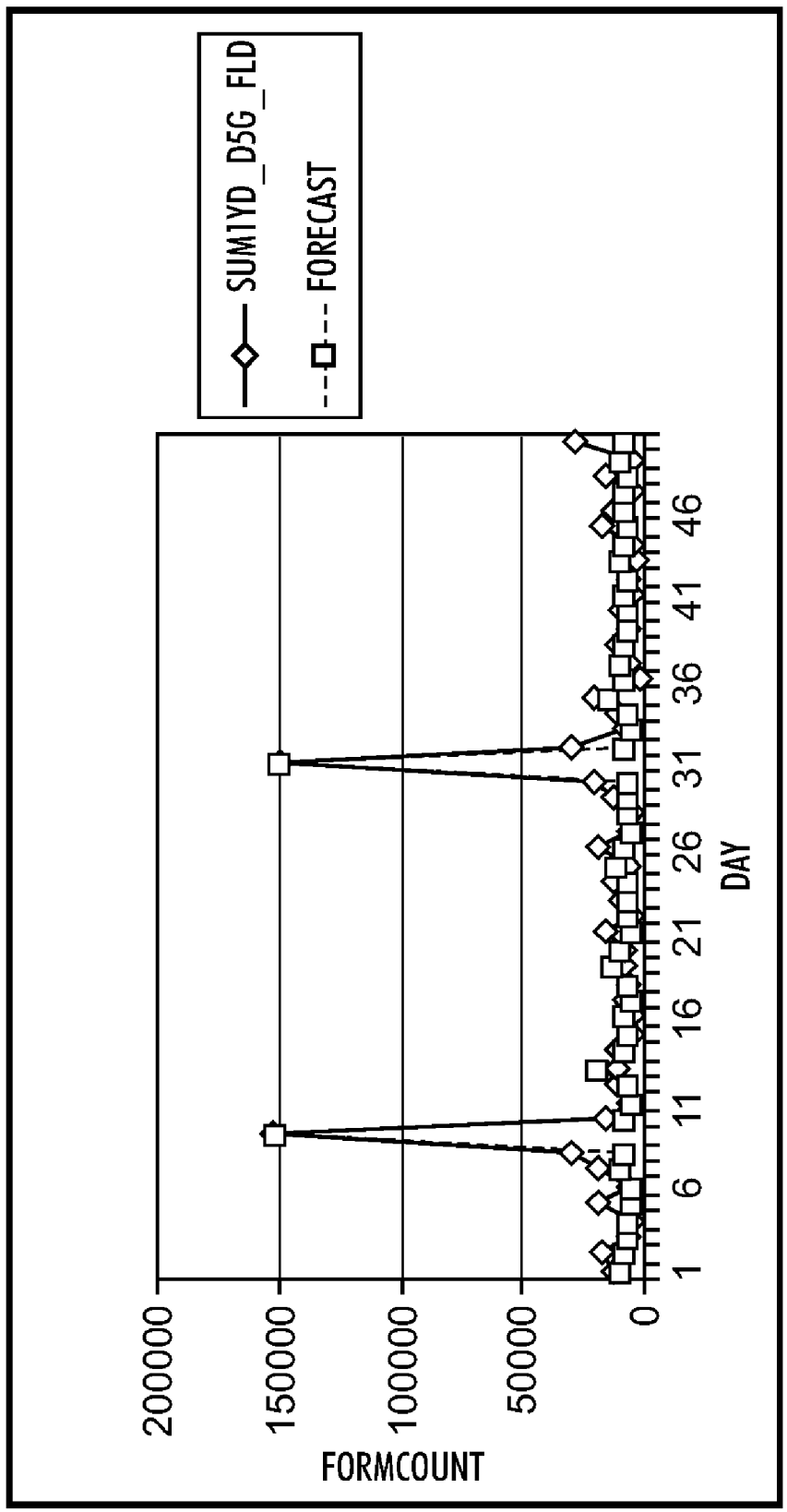
FIG. 6 is a graph illustrating a forecast in which low variability demand is pooled, high-variability demand is kept separate, and the independent forecasts then summed to obtain an aggregate forecast.

Contrary to the above approach, in which demand is pooled for Forms A-C, two demand series, one corresponding with low variability demand (for Form A and Form C) and the other corresponding with high variability demand (for Form B) were created. The demand for Form A and Form C was pooled and forecasted together, while the demand for Form B was forecasted separately. Referring to FIG. 6, a combination of the two forecasts, where MAD=5482.54 and MAPE=0.59, is shown.

The approach associated with FIG. 6 (where two separate forecasts (Form A and Form C pooled, and Form C separate) are combined) can clearly lead to significantly improved forecasting relative to the approach associated with FIG. 5 (where a single forecast based on pooled demand is employed). The improved forecasting is specifically evidenced by the reduction in MAPE between the two approaches (about 40%).

Figure 7:
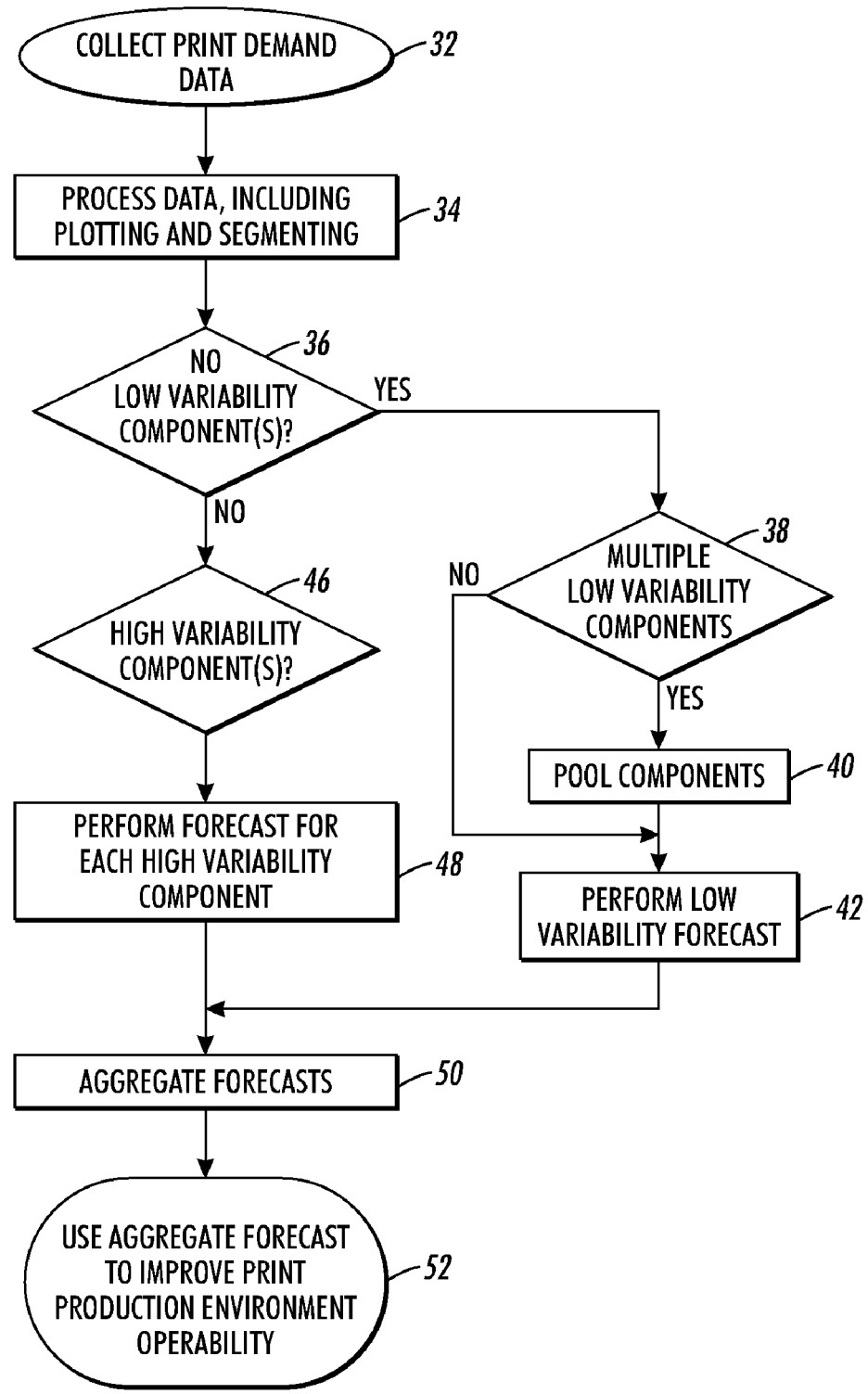
FIG. 7 is a flowchart demonstrating some of the functionality of the disclosed forecasting embodiment.

Referring now to FIGS. 1 and 7, a flowchart illustrating an exemplary implementation for the disclosed embodiments, in which forecasting is achieved with two separate forecasts (one with pooling and one without) is shown. Initially, at 32, print demand data is collected for jobs processed at one or more of print production facilities 10. For ease of description, the example of FIG. 7 is described in the context of a single print shop, but as follows from the description above, the disclosed embodiments are as well suited for use in a single print shop as in a networked printing system with multiple print shops After a suitable amount of demand related data has been collected, the resulting aggregate print demand data can be plotted with the service manager 24, via 34, and then segmented, as described above. At 36, a check for at least one low variability demand component is performed. Referring still to FIGS. 1 and 7, the number of low variability components may be initially assessed at 38 and, if there are multiple low variability demand components, then a combination or pooling of components is performed with 40. Using one of the forecasting algorithms mentioned above, a forecast may be performed at 42 for one or more low variability demand components.

Referring to 46 (FIG. 7), the number of high variability demand components may be determined, and, at 48, a forecast is, if possible, performed for each high variability component. As contemplated, one of several known techniques may be used in forecasting a given high variability component, provided the forecasting technique used allows for convergent forecasting results. It may be noted that (1) the high variability demand components are not, in accordance with the disclosed embodiments, pooled for forecasting, and (2) it may not be possible, by means of the disclosed embodiments, to accurately forecast each high variability demand component. Regarding (2), it has been found that, without some level of structure in a given demand series (e.g., periodicity), forecasting can be difficult. Moreover, it has been found that convergent forecasting results may simply be unattainable for certain high variability demand series.

Referring conjunctively to FIGS. 6 and 7, after performing forecasting on each high variability demand component, where possible, an aggregation or combination of forecasts can be performed at 50. As indicated at 52, the operability of print production system (which might range from a standalone print shop to multiple networked print shops) may be improved with the forecasting approach of the disclosed embodiments. For instance, the improved forecasting approach can be used to improve resource management or to facilitate capacity planning.

Figure 9:
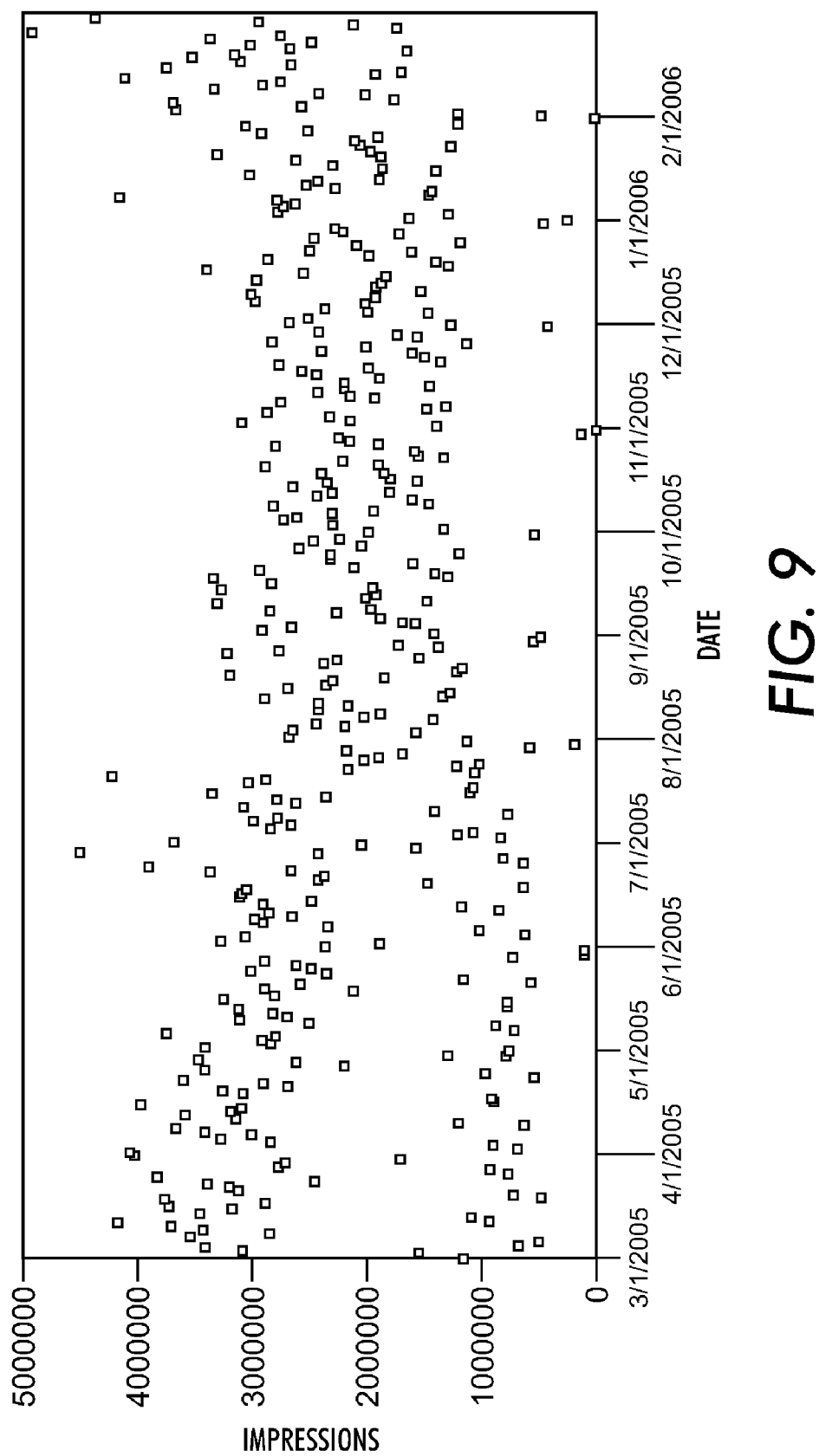
FIG. 9 is graph illustrating a total demand time series, i.e., a set of aggregated demand related data, for one or more print shops.
Figure 11:
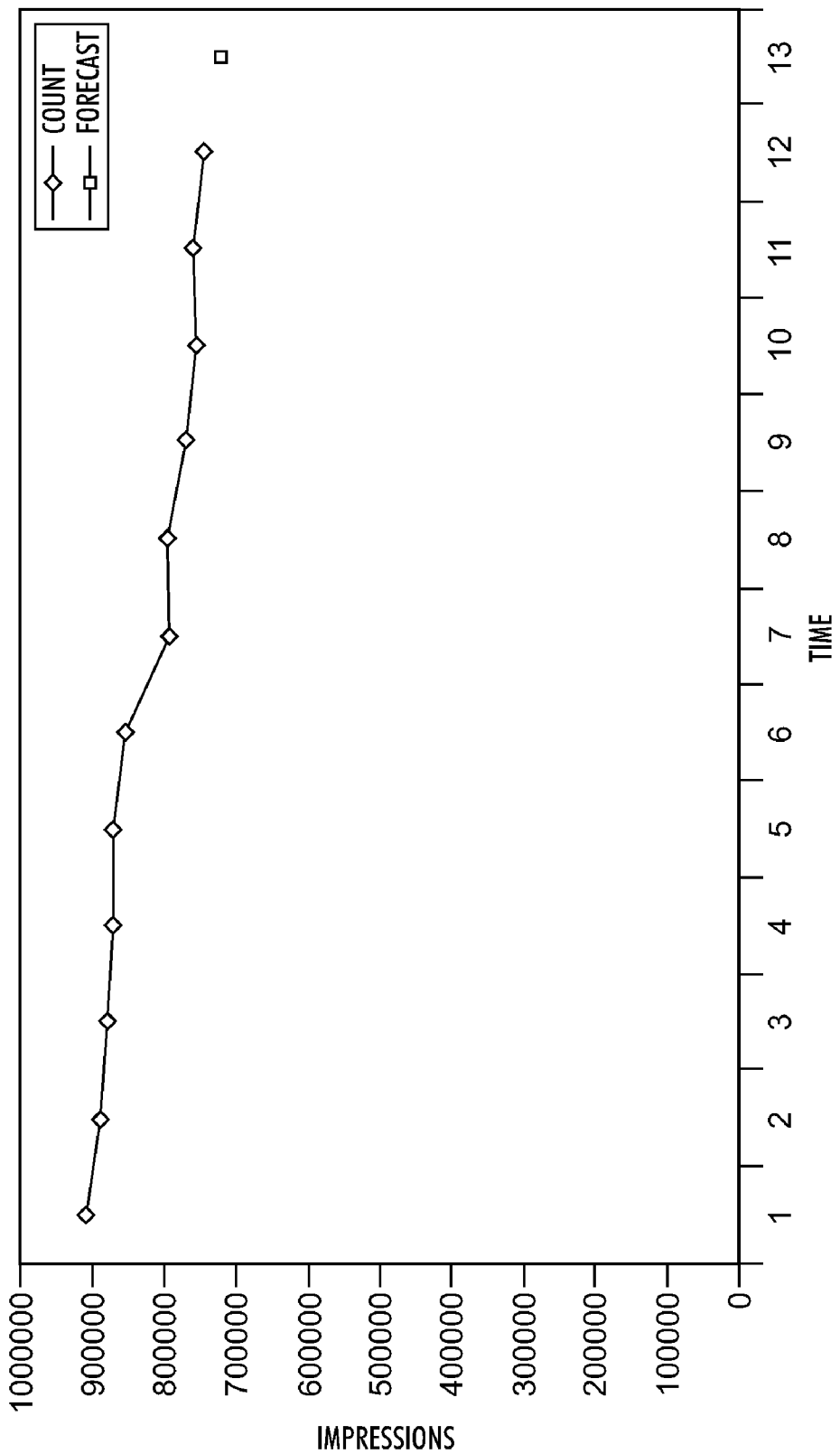
FIG. 11 is a graph in which the demand time series of FIG. 10(e) has been converted into a sequence of events to facilitate forecasting in accordance with the disclosed embodiments.

An approach for simplifying certain aspects of the above-described forecasting technique ("simplifying approach") will be disclosed below. As contemplated, a time series used for forecasting (namely a time series related to total demand (FIG. 9) may be disaggregated based on meta-data related to the jobs within the series. One setting up a forecasting program pursuant to the disclosure below, may desire to define a recurrence pattern for a disaggregated time series that can be used to transform the time series into a sequence of events (FIG. 11). A forecast of future events may be obtained from this sequence of events using an appropriate forecasting technique of the type mentioned above. The recurrence pattern may then be used to inversely transform the forecasted events back into a time series that can be combined with other disaggregated forecasts to obtain an aggregate forecast.

Figure 8:
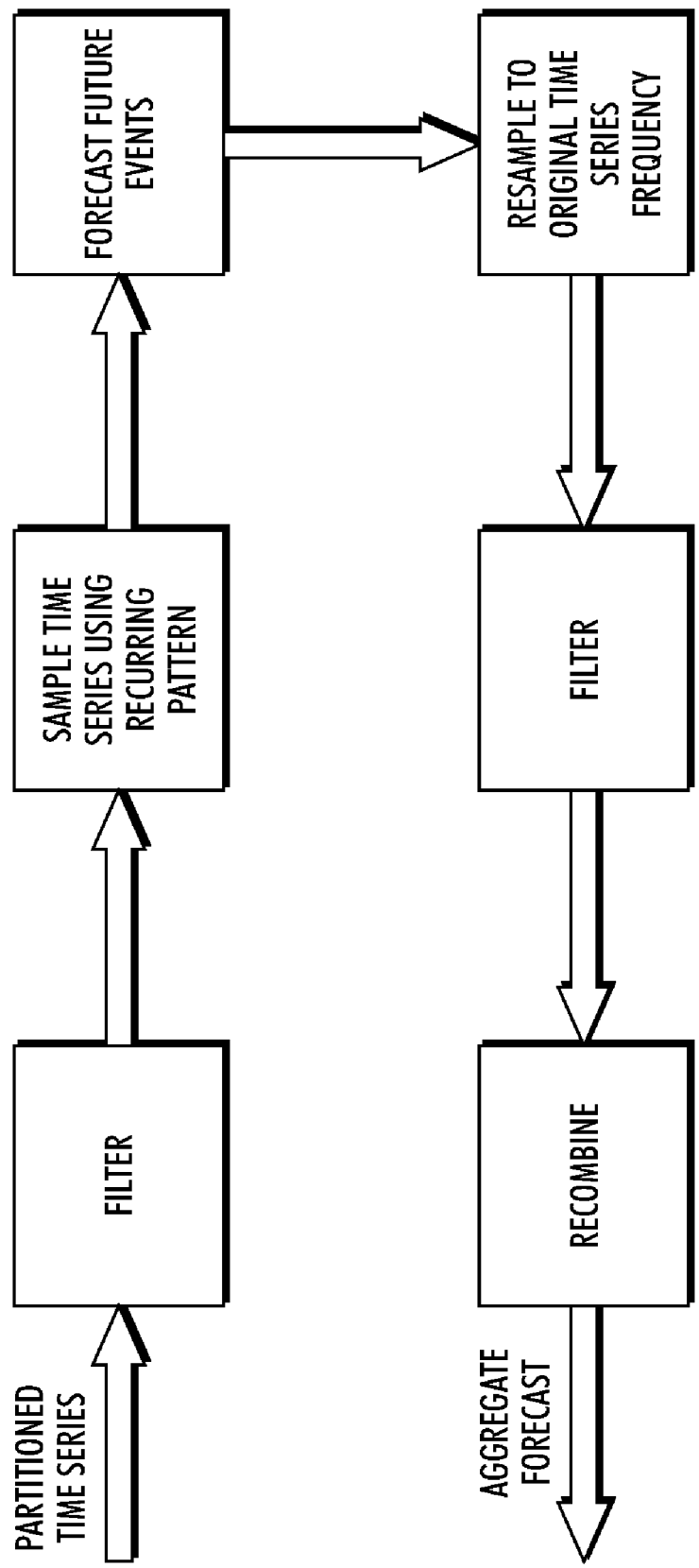
FIG. 8 is a flow diagram illustrating a technique for handling demand data in accordance with the disclosed embodiments.

Referring specifically now to FIG. 8, the simplifying approach is discussed in further detail. At 56, decomposition or partitioning of an aggregated time series, in accordance with the description above, is contemplated. In particular, the total demand of FIG. 9 may be partitioned into the six components of FIGS. 10(a)-10(f). While each one of FIGS. 10(a)-10(e) represent an individual demand component, FIG. 10(f)

represents a sum of the remaining demand components—essentially a "catch-all." It has been found that forecasting with respect to the individual demand components is sufficient to obtain a suitably representative aggregate plot of forecasted components.

Figure 10A:
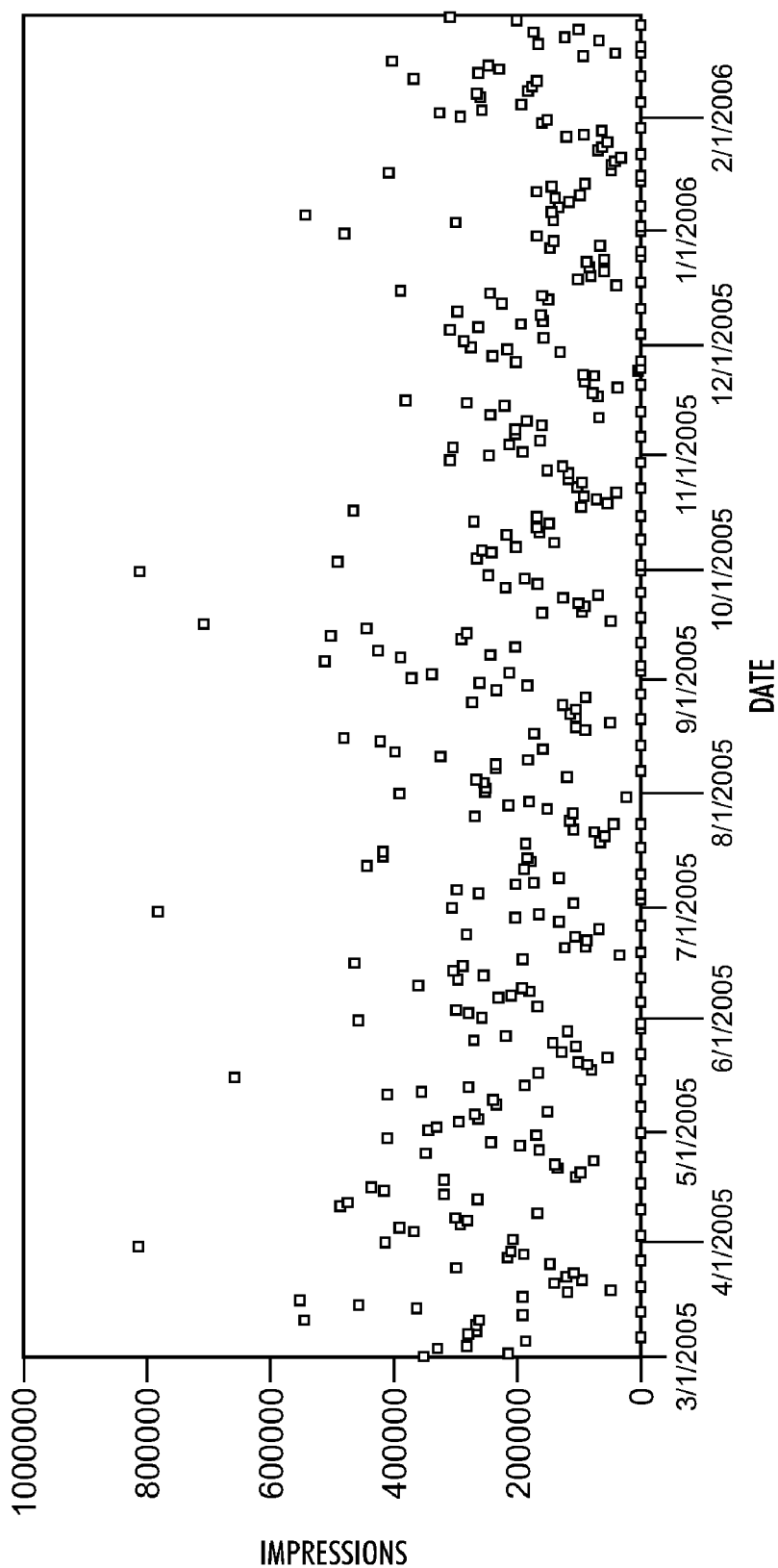
FIGS. 10(a)-10(f) are graphs corresponding with demand components derived from the total demand time series of FIG. 9.
Figure 10B:
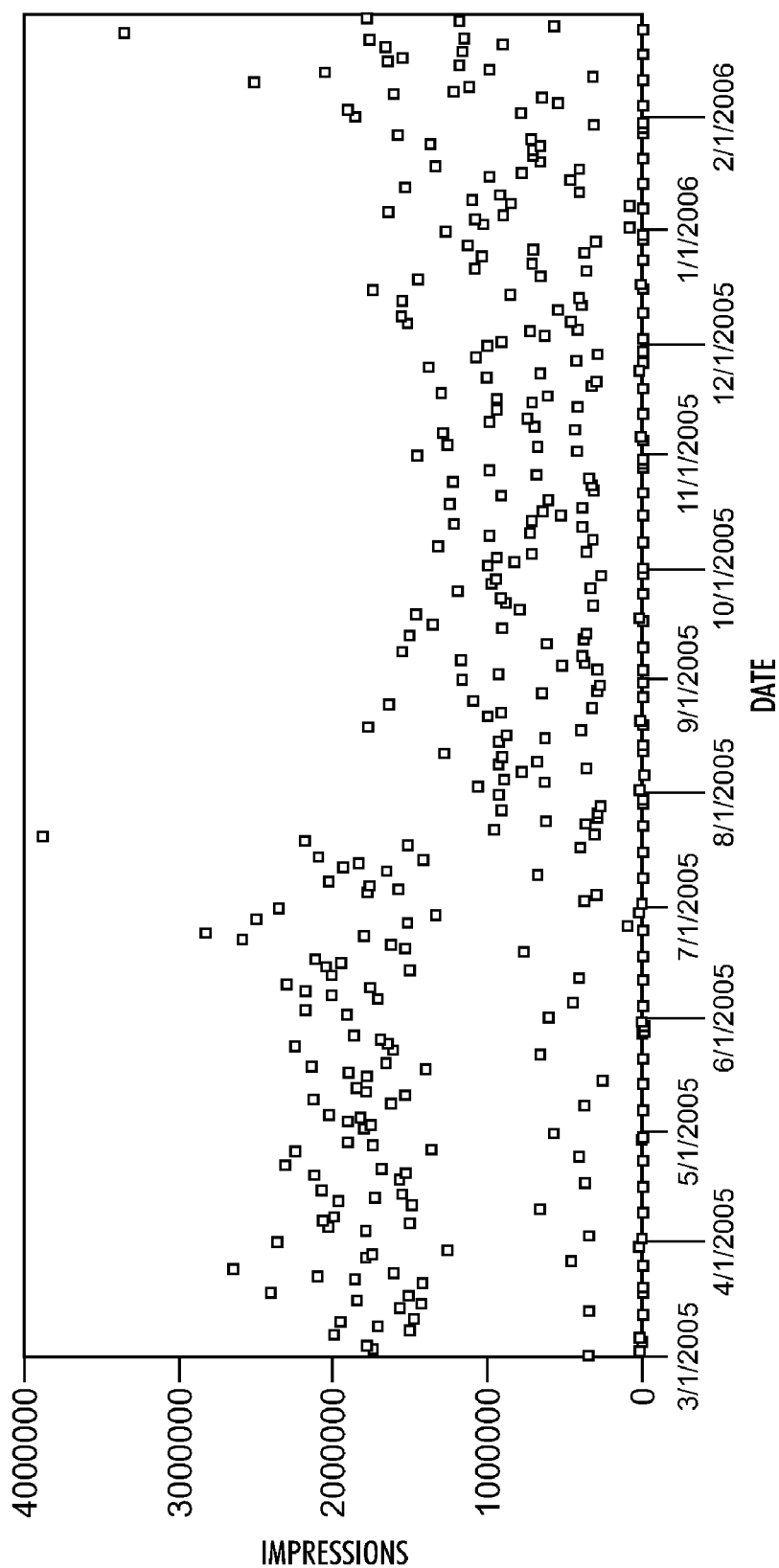
Figure 10C:
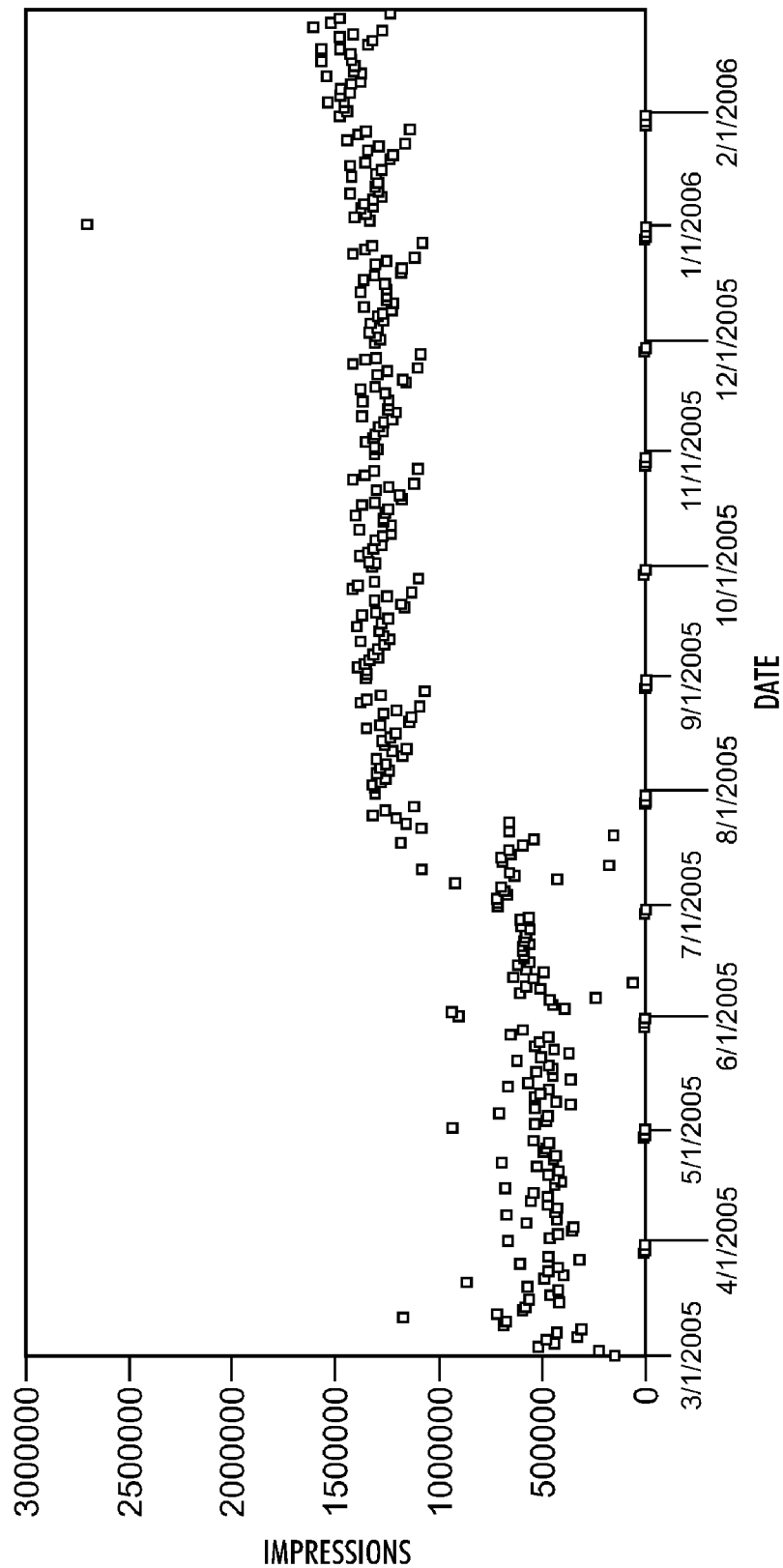
Figure 10D:
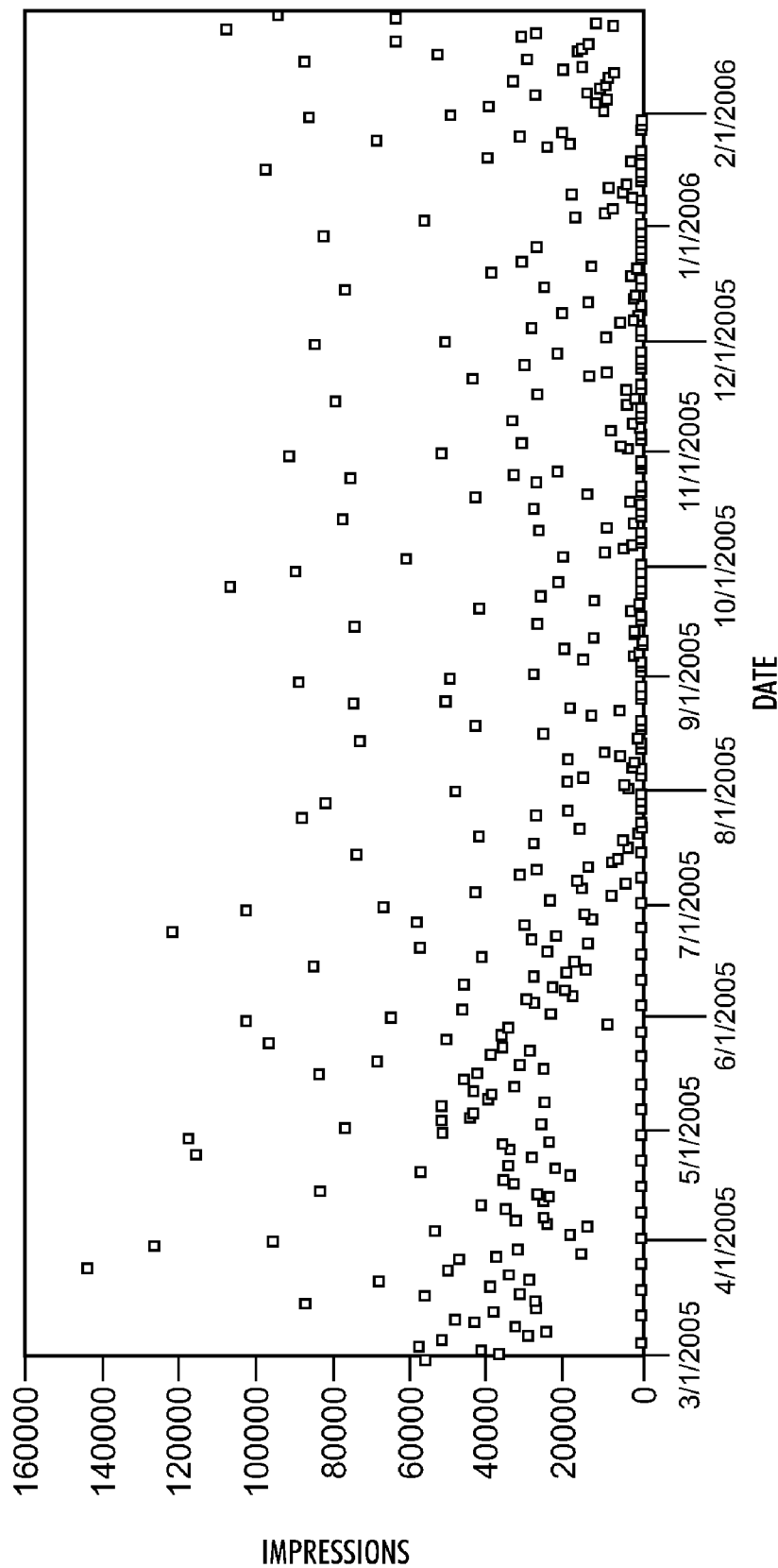
Figure 10E:
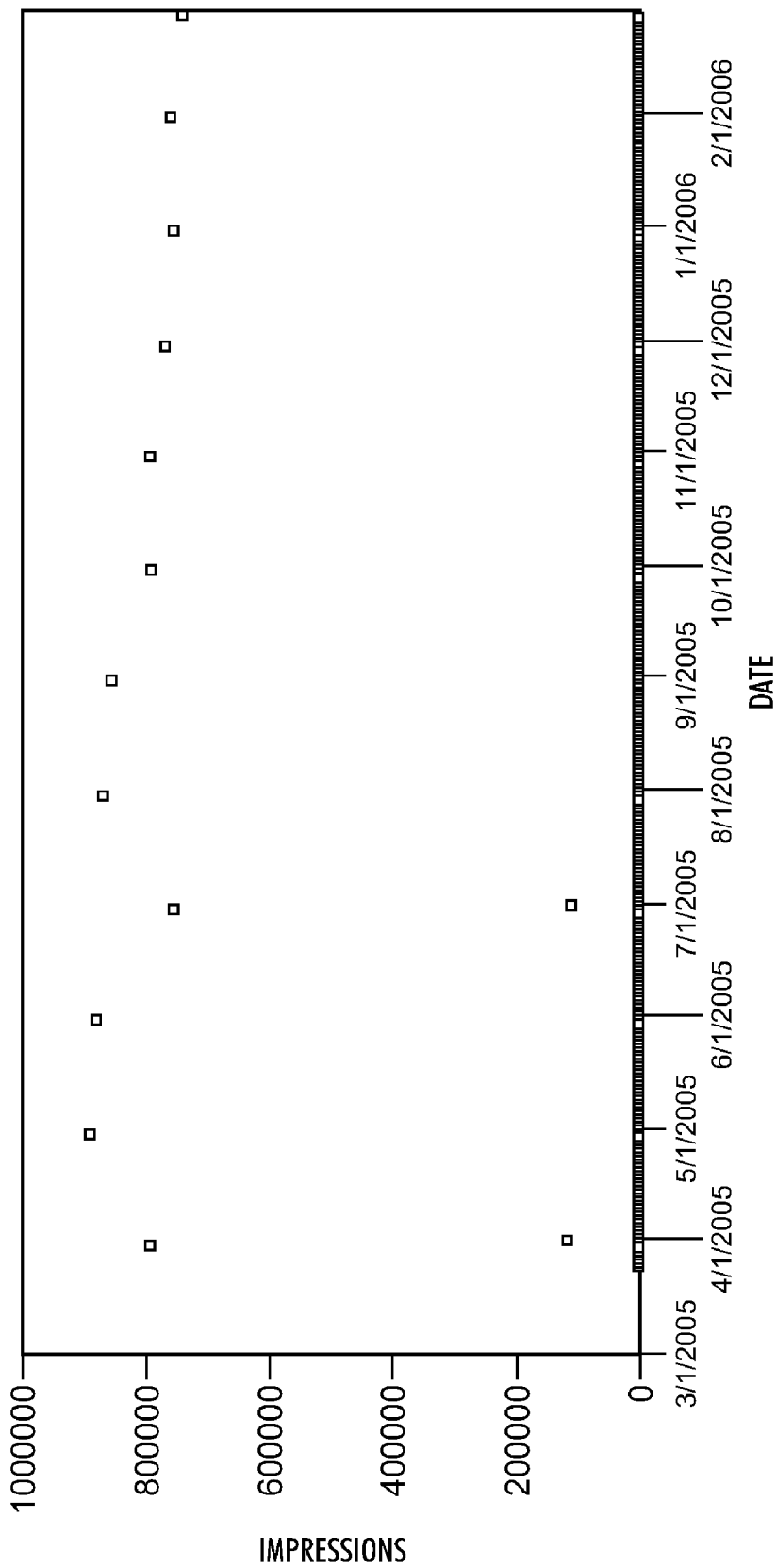
Figure 10F:
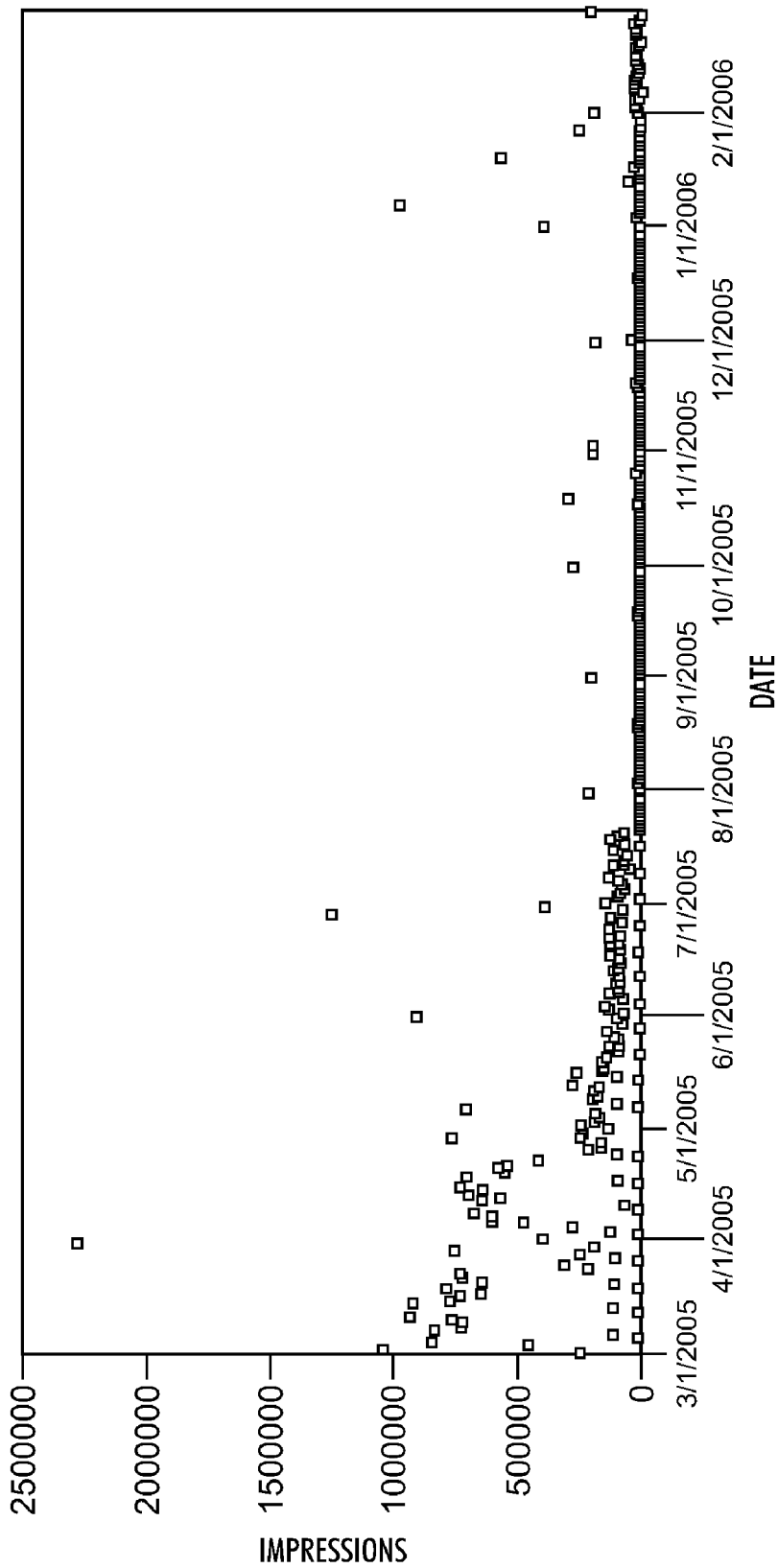

For ease of discussion, description of the simplifying approach will only focus on forecasting with respect to one of the demand components, namely FIG. 10(e). As should be appreciated, in practice, the approach used in processing the demand data of FIG. 10(e) would also be used in processing other individual demand components, such as the demand components of FIGS. 10(a)-10(d). Referring specifically to 58 of FIG. 8, filtering is performed to accommodate for job variability. That is, in some cases where events extend over a period of days, a discrete event can be constructed by pre-filtering a given time series. For example, a particular job type may be seen to create demand only around the 15$^{th}$ and around the last day of each month. The demand on the days surrounding those two dates can be summed to create demand events associated with the recurrence pattern on the 15$^{th}$ and last day of the month. As will appear, the weights of the points can be adjusted to allow for a construction of sequences. This is particularly advantageous for simplifying graphs in which there are several moments (namely days) in which no impressions are received and moments in which there are significant spikes.

Referring particularly to FIG. 10(e), the corresponding demand component can be can be pre filtered and sampled (via 58 and 60) using the following recurrence pattern which generates events on the last day of every month beginning on Mar. 1, 2005 (see IETF RFC 2445) [as is known, IETF stands for "Internet Engineering Task Force," and detailed information regarding IETF RFCs can be obtained by reference to www.ietf.org/rfc]:

DTSTART;TZID=US-Eastern;20050301T000000
RRULE;FREQ=MONTHLY;SETPOS=−1

It should be appreciated that a recurrence pattern might be suggested by the sorts of jobs typically received by a given production site or environment. Using 58 and 60 of FIG. 9 allows for the creation of a sequence of events of the type shown in FIG. 11. In turn, one of several suitable forecasting techniques (possibly including one or the ones mentioned above) can be employed (62) to predict a next event. It should be appreciated that forecasting with the transformed data set of FIG. 11 can be considerably easier than forecasting with the set of demand component points of FIG. 10(e) since cyclic variation of FIG. 10(e) (e.g., points corresponding with 0 impressions) does not exist in the plot of FIG. 10(e).

Referring particularly to FIG. 10(e), the corresponding demand component can be can be pre filtered and sampled (via 58 and 60) using the following recurrence pattern which generates events on the last day of every month beginning on Mar. 1, 2005 (see IETF RFC 2445) [as is known, IETF stands for "Internet Engineering Task Force"]:

Based on the above description, the following features of the disclosed embodiments should now be apparent:

Each demand component (comprising a set of demand component related points corresponding with a first time scale) may be processed in such a way that forecasting of a demand component related point can be performed with demand component related points corresponded with the second time scale. In turn, both the forecasted demand component related point and demand component related points corresponded with the second time scale can be corresponded with the first time scale. This correspondence can be achieved, in part, by reference to an original time series frequency associated with the set of aggregated points. An output of the reaggregated results, possibly provided in the form of a report, may be provided.

Pursuant to disaggregating the set of aggregated points, weights associated with demand component related points may be adjusted to facilitate forecasting. Additionally, forecasting may also be facilitated by sampling the set of aggregated points with a given recurrence pattern. The given recurrence pattern may be suggested by jobs analyzed at one or more print shops. Advantageous aggregate forecasts can be obtained even when forecasting is performed for less than all of the demand components. In one example, at least one demand component may correspond with a high variability demand component and another demand component corresponds with a low variability demand component.

The print demand forecasting technique may be performed across a network. In this way the set of aggregated demand data can be developed at one location on a network and processed at another location on the network. Consequently, data can be collected and stored at one site, and then transferred to another site where it can be stored for processing.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print demand forecasting system for use with a print production system in which multiple print jobs are processed over a selected time interval, comprising:
   a data collection tool, said data collection tool collecting print demand data for each print job processed during the selected time interval, wherein the print demand data comprises a set of aggregated demand related points corresponding with a first time scale;
   a memory; and
   a computer implemented service manager for processing the stored set of aggregated demand related points to obtain a first demand component and a second demand component, the first demand component including a first set of demand component related points and the second demand component including a second set of demand component related points, wherein each one of a total number of demand component related points in the first set of demand component related points and a total number of demand component related points in the second set of demand component related points is less than a total number of aggregated demand related points, said memory comprising one or more programming instructions that, when executed, instruct said computer implemented service manager to:
   process the first set of demand component related points in such a way that at least some of the demand component related points of the first set of demand component related points are corresponded with a second time scale, wherein processing the first set of demand component related points comprises sampling the first set of demand component related points with a recurrence pattern, forecast a demand component related point with the first set of demand component related points corresponded with the second time scale, and correspond both the forecasted demand component related point and the first set of demand related points corresponded with the second time scale with the first time scale to obtain a third set of demand component related points.

2. The print demand forecasting system of claim 1, in which the set of aggregated demand related points comprises a first set of aggregated demand related points, and in which the forecasted demand component related point comprises a first forecasted demand component related point, wherein said memory further comprising one or more programming instructions that, when executed, instruct said computer implemented service manager to:

process the second set of demand component related points in such a way that the that at least some of the demand component related points of the second set of demand component related points are corresponded with a third time scale, forecast a second demand component related point with the second set of demand component related points corresponded with the second time scale, correspond both the second forecasted demand component related point and the second set of demand related points corresponded with the second time scale with the first time scale to obtain a fourth set of demand component related points, and aggregate the third set of demand component related points with the fourth set of demand component related points to produce a second set of aggregated demand related points.

3. The print demand forecasting system of claim 2, wherein an output, corresponding with the second set of aggregated demand related points, is provided.

4. The print demand forecasting system of claim 1, in which a first demand component related point of the first set of demand component related points has a first weight and a second demand component related point of the first set of demand component related points has a second weight, wherein said memory further comprising one or more programming instructions that, when executed, instruct said computer implemented service manager to:

filter one or both of the first and second demand component related points to change one or both of the first and second weights.

5. The print demand forecasting system of claim 4, wherein, pursuant to corresponding both the first forecasted demand component related point and the second set of demand related points with the first time scale with the first time scale, the second weight is changed to a third weight.

6. The print demand forecasting system of claim 1, in which the set of aggregated demand related points includes an original time series frequency, wherein at least some of the forecasted demand component related point and the first set of demand related points corresponded with the second time scale are resampled to obtain the third set of demand component related points.

7. The print demand forecasting system of claim 1, in which both the first and second sets of demand component related points are a subset of two or more sets of demand component related points and in which a sum of demand component related points for the two or more sets of demand component related points is less than a total number of demand related points of the set of aggregated demand related points, wherein said computer implemented service manager processes the stored set of aggregated demand related points to obtain a fourth set of demand component related points, wherein a sum of a total number of demand component related points for the subset of two or more sets of demand component related points and the fourth set of demand component related points is substantially equal to the total number of demand related points of the set of aggregated demand related points.

8. The print demand forecasting system of claim 1, further comprising a network with which at least one of said data collection tool and said computer implemented service manager communicate.

9. The print demand forecasting system of claim 8, wherein said data collection tool is disposed remotely of said computer implemented service manager and the set of aggregated demand related points is transmitted across the network from said data collection tool to said computer implemented service manager.

10. The print demand forecasting system of claim 8, in which the memory comprises a first memory, further comprising a second memory, wherein said second memory is operatively associated with said data collection tool and said first memory is operatively associated with said computer implemented service manager.

11. A print demand forecasting method for use with a print production system in which multiple print jobs are processed over a selected time interval, comprising:

A. using a processor to process a stored set of aggregated demand related points, corresponding with a first time scale, to obtain a first demand component and a second demand component, the first demand component including a first set of demand component related points and the second demand component including a second set of demand component related points, wherein each one of a total number of demand component related points in the first set of demand component related points and a total number of demand component related points in the second set of demand component related points is less than a total number of aggregated demand related points; and B. using the processor to (1) process the first set of demand component related points in such a way that the that at least some of the demand component related points of the first set of demand component related points are corresponded with a second time scale, (2) forecast a demand component related point with the first set of demand component related points corresponded with the second time scale, (3) correspond both the forecasted demand component related point and the first set of demand related points corresponded with the second time scale with the first time scale to obtain a third set of demand component related points, and (4) sample the first set of demand component related points with a recurrence pattern.

12. The print demand forecasting method of claim 11, further comprising:

C. collecting print demand data for each print job processed during the selected time interval, wherein the print demand data comprises the set of aggregated demand related points corresponding with the first time scale.

13. The print demand forecasting method of claim 12, where said at least one of said A and B is performed at a first network site and said C is performed at a second network site, further comprising disposing the first network site remotely of the second network site.

14. The print demand forecasting method of claim 11, in which the set of aggregated demand related points comprises a first set of aggregated demand related points and the forecasted demand component related point comprises a first demand component related point, further comprising:
- C. using the processor to (1) process the second set of demand component related points in such a way that the that at least some of the demand component related points of the second set of demand component related points are corresponded with a third time scale, (2) forecast a second demand component related point with the second set of demand component related points corresponded with the second time scale, (3) correspond both the second forecasted demand component related point and the second set of demand related points corresponded with the second time scale with the first time scale to obtain a fourth set of demand component related points, and (4) aggregate the third set of demand component related points with the fourth set of demand component related points to produce a second set of aggregated demand related points.

15. The print demand forecasting method of claim 14, further comprising:
- D. providing an output, corresponding with the second set of aggregated demand related points.

16. The print demand forecasting method of claim 11, in which a first demand component related point of the first set of demand component related points has a first weight and a second demand component related point of the first set of demand component related points has a second weight, further comprising:
- C. filtering one or both of the first and second demand component related points to change one or both of the first and second weights.

17. The print demand forecasting method of claim 11, in which the set of aggregated demand related points includes an original time series frequency, wherein said B(3) includes resampling at least some of the forecasted demand component related point and the first set of demand related points corresponded with the second time scale to obtain the third set of demand component related points.

18. The print demand forecasting method of claim 11, in which the first and second sets of demand component related points are a subset of two or more sets of demand component related points and in which a sum of demand component related points for the two or more sets of demand component related points are less than a total number of demand related points of the set of aggregated demand related points, further comprising:
- C. processing the stored set of aggregated demand related points to obtain a fourth set of demand component related points, wherein a sum of a total number of demand component related points for the subset of two or more sets of demand component related points and the fourth set of demand component related points is substantially equal to the total number of demand related points of the set of aggregated demand related points.

\* \* \* \* \*